No. 835,227. PATENTED NOV. 6, 1906.
R. & F. POHL.
DYNAMO ELECTRIC MACHINE.
APPLICATION FILED JAN. 28, 1905.
3 SHEETS—SHEET 1.
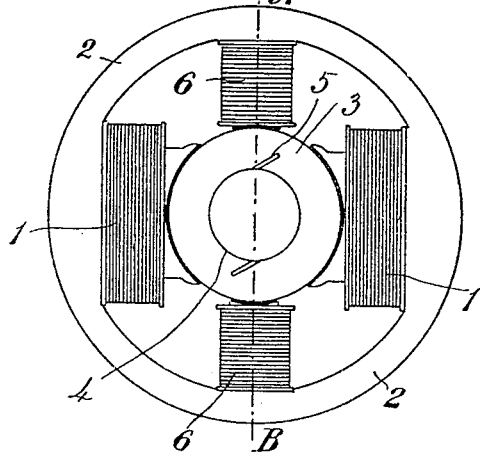
Fig: 1.
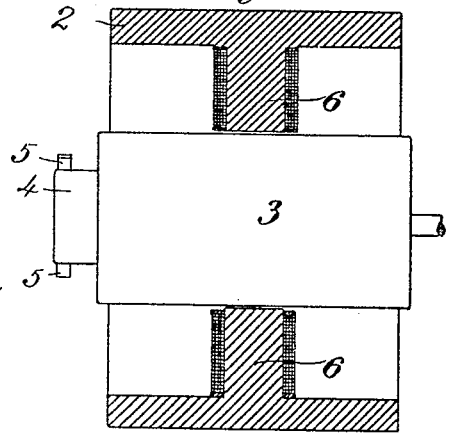
Fig: 2.
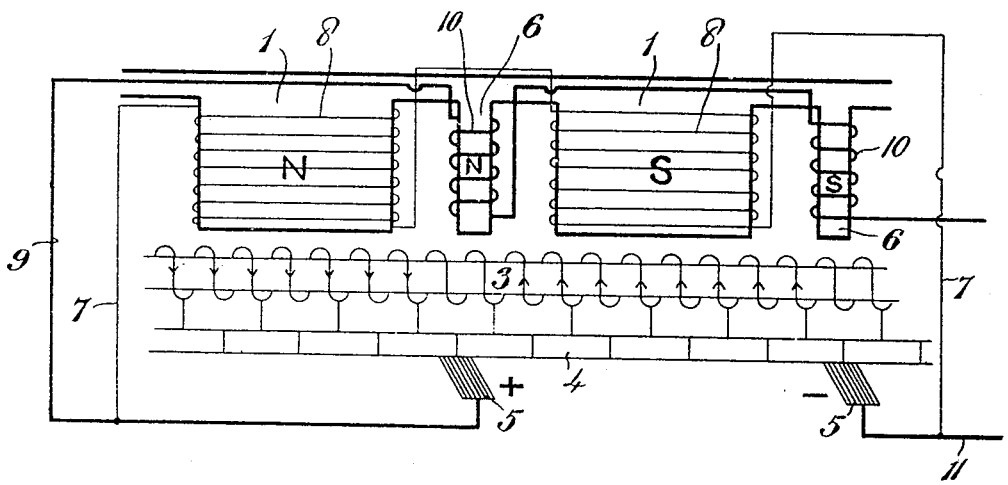
Fig: 3.
Witnesses
Edwin D. Bartlett
Albert J. Cale
Inventors
Robert Pohl and Felix Pohl
per Herbert Sefton Jones
Attorney No. 835,227.  
PATENTED NOV. 6, 1906.
R. & F. POHL.  
DYNAMO ELECTRIC MACHINE.  
APPLICATION FILED JAN. 28, 1905.
3 SHEETS—SHEET 2.
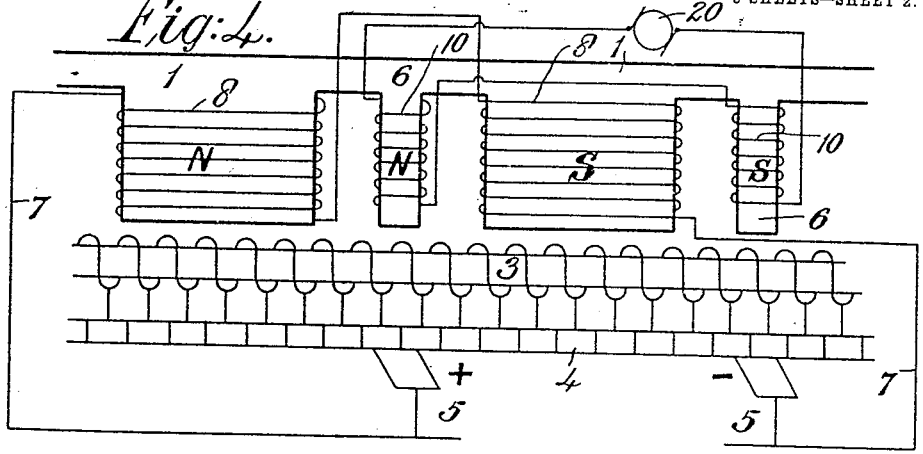
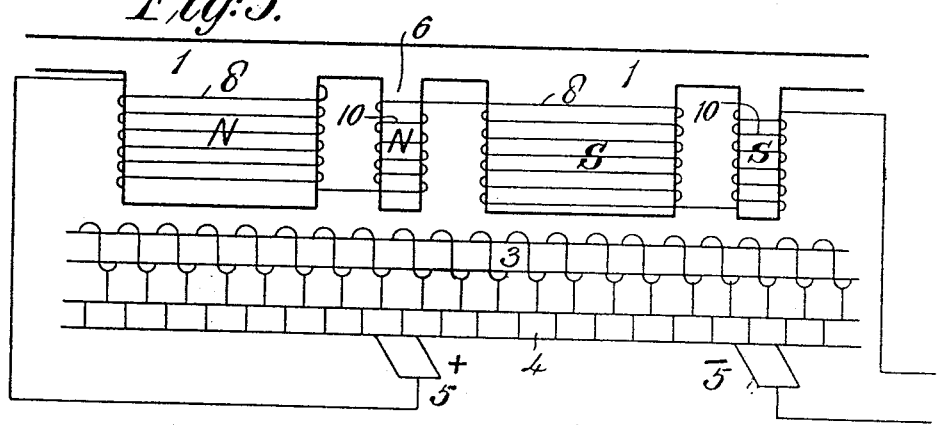
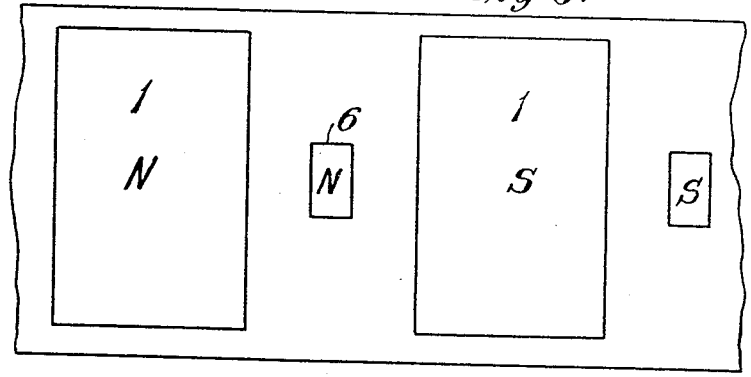
Witnesses  
Edwin D Bartlett  
Albert V Beale
Inventors  
Robert Pohl and Felix Pohl  
per Herbert Sefton Jones  
Attorney.

No. 835,227. PATENTED NOV. 6, 1906.
R. & F. POHL.
DYNAMO ELECTRIC MACHINE.
APPLICATION FILED JAN. 28, 1905.
3 SHEETS—SHEET 3.
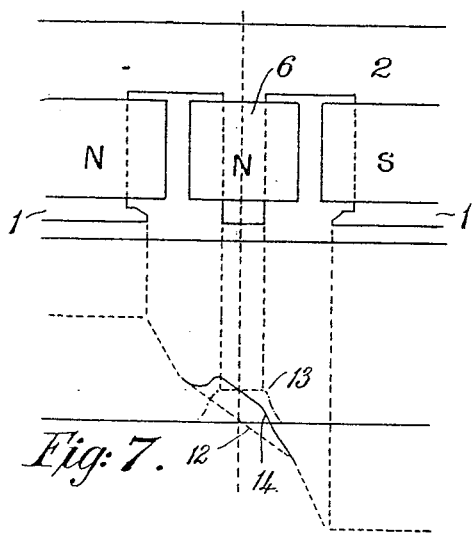
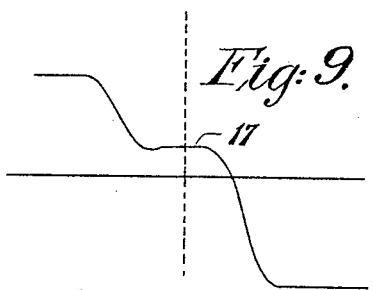
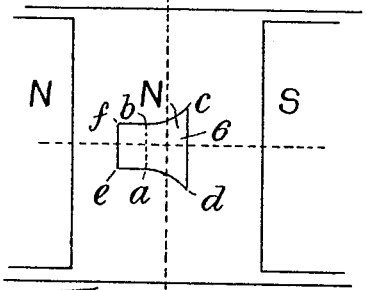
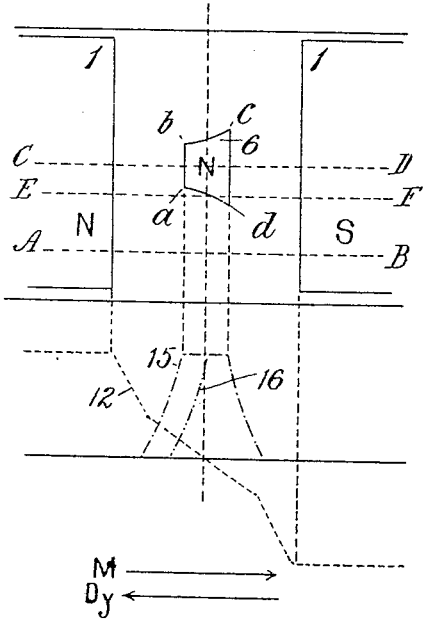
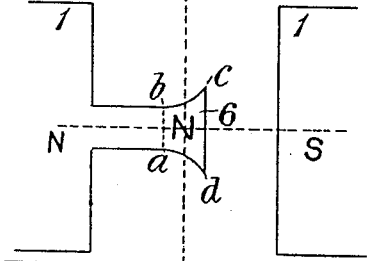
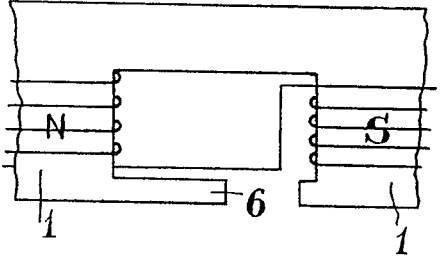
Witnesses
Edwin D. Bartlett
Albert V. Beale.
Inventors
Robert Pohl and Felix Pohl
per Herbert Sefton Jones
Attorney.

UNITED STATES PATENT OFFICE.

ROBERT POHL, OF BRADFORD, ENGLAND, AND FELIX POHL, OF COLOGNE, GERMANY, ASSIGNORS OF ONE-HALF TO THE PHOENIX DYNAMO MANUFACTURING COMPANY LIMITED, OF THORNBURY WORKS, BRADFORD, ENGLAND.

DYNAMO-ELECTRIC MACHINE.

No. 835,227.   Specification of Letters Patent.   Patented Nov. 6, 1906.

Application filed January 28, 1905. Serial No. 243,079.

*To all whom it may concern:*

Be it known that we, ROBERT POHL, electrical engineer, of the Phoenix Dynamo Manufacturing Company Limited, a subject of the Emperor of Germany, residing at Thornbury Works, Bradford, in the county of York, England, and FELIX POHL, engineer, a subject of the Emperor of Germany, residing at Karolinger Ring $8^{II}$, Cologne-on-Rhine, in the Empire of Germany, have invented new and useful Improvements in Dynamo-Electric Machines, of which the following is a specification.

This invention relates to electric dynamos and motors; and it consists principally in the provision of additional pole-pieces of a particular form whereby the commutation is made as nearly perfect and sparkless as is possible, while compounding and overcompounding effects may be simultaneously produced if desired.

In the accompanying drawings, which will be referred to hereinafter, Figure 1 shows a simple form of dynamo-electric machine, illustrating this invention. Fig. 2 shows a section of Fig. 1 taken on the line A B. Fig. 3 is a developed diagram of a shunt-wound dynamo-electric machine constructed according to this invention and having the auxiliary poles excited by the main current. The machine is assumed to be substantially of the type illustrated in Figs. 1 and 2. Figs. 4 and 5 are similar diagrams to Fig. 3 and show, respectively, the windings for exciting the auxiliary poles by a separate current and for exciting the auxiliary poles in series with the main poles in a series-wound machine. Fig. 6 shows a developed diagram of the pole-faces of the machines illustrated in the preceding figures. Figs. 7, 8, 9, 10, 11, 12, and 13 are diagrammatic views, hereinafter referred to, illustrating arrangements of the auxiliary poles and the fields which may be produced when such poles are used.

As is well known, if the reversal of current (commutation) in the short-circuited coils of a direct-current armature is to take place in such a way that the current close beneath the brushes shall be constant, so that sparking cannot take place and the loss of energy in commutation may be reduced to a minimum, then in each short-circuited coil there must always be an electromotive force induced, which is represented by the equation $$(1) \quad e = (L + \Sigma M)\frac{2\,ia}{T} - ia\,Rs\left(1 - 2\frac{t}{T}\right)$$

In this equation, L indicates the coefficient of self-induction of the coil in question. $\Sigma$ M represents the sum of all the coefficients of the mutual induction of the simultaneously short-circuited coils. $ia$ represents the current per armature-section, $Rs$ the resistance of a coil, $t$ the time elapsed up to the moment of observation since the beginning of the short-circuiting, and T the entire time of the commutation.

Now in the case of medium and larger sized machines the second part of the above equation is so small in comparison with the first part that it may be neglected. An ideal commutation is consequently effected if in the short-circuited coil an electromotive force $$(2) \quad e = (L + \Sigma M)\frac{2\,ia}{T}$$

is induced, which, as should be specially noted, is constant during the entire period of the commutation. This occurs when the magnetic field in which the short-circuited coils move has a constant value of definite magnitude over the entire commutation zone.

Proceeding from the consideration that it is only necessary to induce in the short-circuited coils a constant electromotive force of the right value, we have arrived at the idea of obtaining this effect by means of a local compression of the field in the axial direction. This can be produced by the use of auxiliary electromagnetic poles the axial length of which only amounts to a small fraction of the armature length. As the electromotive force to be induced according to equation 2 only amounts to about one to three volts, whereas in machines of the size under consideration an electromotive force of from six to ten up to twenty volts is induced in each coil below the principal poles we may obtain the necessary commutation electromotive force with an electromagnet whose axial length only amounts to from a quarter to a tenth of that of the armature if the auxiliary pole be as strongly magnetized as are the principal magnets. Preferably this axial length can be still further diminished by the application of high magnetization. The application of commutation-magnets of so small an axial length, together with the simultaneous increase of the density of the lines of force, has the following advantages: First, the magnetic resistance to the lines of force which flow around the short-circuited coils is only diminished to a trifling extent through the application of such short and highly-saturated magnets. In consequence of this the constants L and $\Sigma$ M are only increased by a very small amount, and this is of special, in many cases of decisive, importance in securing satisfactory commutation. Secondly, owing to the favorable proportion of the length to the width of these auxiliary magnets the weight of copper required for the winding is small, because a large proportion of the ampere-turns to be used only serve to balance the opposed armature ampere-turns, and this proportion does not increase with the increase in the saturation.

Figs. 1 and 2 show in a somewhat diagrammatic manner a dynamo-electric machine having two main field-poles 1, mounted on a yoke 2, an armature 3, of any suitable known type, with a commutator 4 and brushes 5, and auxiliary poles 6, mounted on the yoke between the main field-poles. These auxiliary poles may be excited in any desired way, either by the main current or by a separate current. Such methods of connecting are well understood by electrical engineers and will be used by them according to circumstances. Fig. 3 shows diagrammatically, by way of example, the connections for exciting the auxiliary poles of a shunt-wound machine by the main-circuit current. The yoke, with the poles, and the armature, with the commutator, are here supposed to be spread out or "developed" and brought into the plane of the drawing, with the object of showing the connections more clearly. It will be seen that from the windings of armature 3 and the commutator 4 the current flows through the + brush and by shunt-leads 7 through the windings 8 of the main poles 1 back to the − brush, while the main circuit is from the + brush by lead 9 through the windings 10 of the auxiliary poles 6 to the external circuit and back to the − brush by lead 11.

Fig. 4 shows the corresponding winding for a machine in which the auxiliary poles are excited by current from a separate dynamo or source of current 20, connected to the coils 10 of the auxiliary poles 6. Fig. 5 shows the corresponding winding for a machine in which the main poles and auxiliary poles are excited by the main current flowing in series from the + brush 5 through both sets of coils 8 and 10.

A machine constructed on the principles above explained may be reversible, if required, and the polarity of the auxiliary poles will alter with the change in the direction of the current, as is required. The auxiliary poles must in such case have an approximately rectangular surface in order that practically the same effect may be produced in whichever direction the machine is running. This is seen in Fig. 6, which shows the pole-surfaces developed.

Fig. 7 shows diagrammatically (spread out in a straight line) parts of two main poles 1 with one auxiliary pole 6 between them. The field in the zone between the main poles, not taking the auxiliary pole into account, is approximately represented by the dotted line 12. The auxiliary pole gives a field represented by the dotted curve 13. The sum of these fields gives the resultant field represented by the curve 14 in the neutral zone. If the machine is reversed, these curves are simply turned from right to left. It will be seen that the resultant field is not constant in value in the neutral zone, although it is more nearly of the value required by equation 2, while the advantages of using an auxiliary pole of short length in the axial direction are secured, as before stated. For a machine which runs in one direction only or which is mainly required to run in one direction further improvements are possible. For this object it is only necessary to give the pole-surfaces of the commutation-magnets such a form as is illustrated, for instance, in Fig. 8. This figure shows diagrammatically in plan (developed) parts of two main field-poles 1 with a specially-shaped auxiliary pole 6 in the neutral zone between them. The corners of the auxiliary pole are lettered $a\ b\ c\ d$. Below the diagram above referred to are illustrated the curves of the field intensities on various lines. On the line A B the field intensity has the usual form, shown by the plain dotted curve 12. On the line C D through the center of the commutation-magnet there is a field intensity corresponding approximately to the chain-dotted curve 15. Again, on the line E F the curve of field intensity is indicated by the stroke and double-dotted curve 16.

If now the curves $b\ c$ and $a\ d$ of the pole-surface be rightly designed, taking into account the distortion of the field caused by the armature reaction, so that the field due to the auxiliary pole will increase in strength as the field due to the main poles falls and reverses or changes in strength, then an electromotive force may be induced in each coil beneath the auxiliary pole, the curve of which electromotive force is illustrated in Fig. 9, and which is both constant in the commutation zone (at 17) and has also the required magnitude according to equation 2.

If a machine is to be made to give the effects of a compounded or overcompounded machine—i. e., to give a constant or increasing potential with increasing load—this can be attained also by giving a suitable form to the pole-surfaces of the commutation-magnets which are excited by the main current, (as in the diagram of connections, Fig. 3.) If, for instance, they are constructed with a one-sided prolongation $a\ b\ e\ f$, Fig. 10, then by this addition projecting beyond the commutation zone lines of force will be produced which act inductively upon coils which are not short-circuited, and therefore occasion a corresponding increase in the total electromotive force of the armature. Thus the desired compounding or overcompounding effect can be produced without the necessity of using extra series coils upon the principal magnets.

In some cases—for instance, with series-wound dynamos and motors—it is possible to proceed a step further and to prolong the pole-surfaces of the commutation-magnets until said magnets finally become joined with one of the main pole-pieces. This is illustrated in Figs. 11 and 12, which show a plan and elevation, respectively, of parts of two main poles 1 1 with the commutation pole-piece 6 formed as a prolongation of the one main pole-shoe. The series winding 18 of the N main pole serves also to excite the auxiliary pole-shoe 6 in this case. In the figures the curvature of the commutation-pole will be in the opposite direction (as compared with the direction of rotation of the armature) for a dynamo as for a motor.

In Fig. 8 the arrow M indicates the direction of rotation of the armature of a motor for the given shape of the pole-piece and the arrow $D^y$ the direction of rotation for the same curvature with a dynamo. The letters N and S indicate polarities of the respective poles to which they are applied. For reversible motors, as before stated, the commutation-poles can still be short axially; but they must have approximatey rectangular pole-faces in order that their effect may be the same for either direction of rotation of the armature.

In some cases a good commutation can be obtained, at least without sparking at the trailing edges of the brushes, by increasing the curvature of the pole-face $a\ b\ c\ d$, as illustrated by dotted lines in Fig. 13, until the face assumes the form $a'\ b'\ c'\ d'$. The electromotive force will not then be constant in the commutation area, but it will be such as to reduce more nearly to zero the current density at the edge of the brush, where sparking is most likely to occur, and good results have been obtained in experiments with such curvatures as are here suggested.

It will be evident that the advantages of producing a constant field in the region between the parts of the armature under the main field-poles can be obtained by giving to the faces of the auxiliary poles the required curvatures, as described with reference to Figs. 10 to 13, no matter where the said poles may be located with respect to the armature or to the main field-poles, so long only as the fields due to the auxiliary poles take effect upon the armature-windings in the required zone.

What we claim is—

1. In a dynamo-electric machine the combination with the armature the field-poles windings and yoke, of intermediate pole-pieces mounted on the yoke and acting upon the armature in the space between the main field-poles, the said intermediate pole-pieces being less than half the length of the main field-poles in the direction of the armature-axis and having a section such that they are approximately saturated by the flux created by the current flowing through the winding of said poles, that a minimum amount of copper may be used in the winding, and that a minimum of area may be presented to the action of the magnetomotive force of the armature-conductors.

2. In a dynamo-electric machine, the combination with the armature, field-poles and yoke, of intermediate pole-pieces between the main field-poles, said intermediate pole-pieces being of shorter length than the main field-poles in the axial direction of the armature, and being of increasing breadth in the direction toward the main poles whose polarity is contrary to that of the respective intermediate poles.

3. In a dynamo-electric machine, the combination with the armature, field-poles and yoke, of intermediate pole-pieces between the main field-poles, said intermediate pole-pieces having their effective faces so shaped as to increase in breadth toward the main poles whose polarity is contrary to that of the respective intermediate poles.

4. In a dynamo-electric machine, the combination with the armature, field-poles and yoke, of intermediate pole-pieces between the main field-poles, said intermediate pole-pieces having their effective faces shaped in the region of commutation, in such manner that they increase in breadth toward the main poles whose polarity is contrary to that of the respective intermediate poles, and having also extensions beyond the region of commutation whereby compounding and overcompounding effects may be obtained.

5. The combination of an armature, a yoke and main pole-pieces thereon, windings for said main poles, intermediate poles the surfaces of which presented to the armature are broader near one main pole than the other, and windings for said intermediate poles so connected with the armature-windings that the current flowing round the coils of the intermediate poles is proportional to the armature-current.

In testimony whereof we have signed our names to this specification in the presence of two subscribing witnesses.

ROBERT POHL.
FELIX POHL.

Witnesses:
WILLIAM KUEGGERS,
JOH. SCHOLZ.